US010136287B2

(12) United States Patent
Lee et al.

(10) Patent No.: US 10,136,287 B2
(45) Date of Patent: Nov. 20, 2018

(54) METHOD AND APPARATUS FOR CLOSE PROXIMITY COMMUNICATIONS

(71) Applicant: ELECTRONICS AND TELECOMMUNICATIONS RESEARCH INSTITUTE, Daejeon (KR)

(72) Inventors: Jae Seung Lee, Daejeon (KR); Moon Sik Lee, Daejeon (KR); Young Hoon Kim, Daejeon (KR); Hoo Sung Lee, Sejong (KR); Jae Woo Park, Daejeon (KR); Gyung Chul Shin, Daejeon (KR); Ik Jae Chun, Daejeon (KR); Jee Yon Choi, Daejeon (KR); Dong Seung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 24 days.

(21) Appl. No.: 15/206,420

(22) Filed: Jul. 11, 2016

(65) Prior Publication Data
US 2017/0013507 A1    Jan. 12, 2017

(30) Foreign Application Priority Data

Jul. 9, 2015   (KR) .................. 10-2015-0098031
Sep. 8, 2015   (KR) .................. 10-2015-0127287

(Continued)

(51) Int. Cl.
*H04W 4/80* (2018.01)
*H04W 56/00* (2009.01)
(Continued)

(52) U.S. Cl.
CPC ............ *H04W 4/80* (2018.02); *H04B 5/0031* (2013.01); *H04B 7/0413* (2013.01);
(Continued)

(58) Field of Classification Search
CPC ... H04W 28/06; H04W 28/065; H04W 28/00; H04W 28/008; H04W 72/04;
(Continued)

(56) References Cited

U.S. PATENT DOCUMENTS 8,830,917 B1 *  9/2014  Zhang ................. H04W 4/00
                                                              370/329
9,608,771 B2 *  3/2017  Zhang ................. H04L 1/0083
(Continued)

OTHER PUBLICATIONS

Tuncer Baykas et al., "IEEE 802.15.3c: The First IEEE Wireless Standard for Data Rates over 1 Gb/s", IEEE Communications Magazine, Jul. 2011.

*Primary Examiner* — Warner Wong
(74) *Attorney, Agent, or Firm* — LRK Patent Law Firm

(57) ABSTRACT

A method and apparatus for close-proximity communication. The close-proximity communication method performed by a transmitter includes generating a physical layer (PHY) frame including a PHY preamble, a frame header, and a payload field, and transmitting the generated PHY frame to a receiver, in which the frame header may include a media access control (MAC) header, a header check sequence (HCS), and a Reed-Solomon (RS) parity bit.

19 Claims, 29 Drawing Sheets

(30) Foreign Application Priority Data

| Sep. 8, 2015 | (KR) | ........................ 10-2015-0127301 |
| Nov. 5, 2015 | (KR) | ........................ 10-2015-0155387 |
| Nov. 5, 2015 | (KR) | ........................ 10-2015-0155393 |
| Jul. 8, 2016 | (KR) | ........................ 10-2016-0087126 |
| Jul. 8, 2016 | (KR) | ........................ 10-2016-0087178 |

(51) Int. Cl.

| H04B 7/0413 | (2017.01) |
| H04B 5/00 | (2006.01) |
| H04L 12/40 | (2006.01) |
| H04L 29/06 | (2006.01) |
| H04L 29/08 | (2006.01) |
| H04L 12/70 | (2013.01) |
| H04L 1/00 | (2006.01) |

(52) U.S. Cl.
CPC ......... H04W 56/001 (2013.01); *H04L 1/0046* (2013.01); *H04L 12/40071* (2013.01); *H04L 67/147* (2013.01); *H04L 69/161* (2013.01); *H04L 69/22* (2013.01); *H04L 2012/5652* (2013.01)

(58) Field of Classification Search
CPC .. H04W 56/00; H04W 56/001; H04L 1/0028; H04L 1/003; H04L 1/0046; H04L 1/0006; H04L 1/0091; H04L 12/40071; H04L 29/08756; H04L 29/0653; H04L 29/06544; H04L 2012/5652; H04L 27/2692; H04L 27/2613; H04L 69/22; H04L 69/161; H04L 67/147
See application file for complete search history.

(56) References Cited

U.S. PATENT DOCUMENTS

| 9,716,639 | B2* | 7/2017 | Vinod | H04L 43/0811 |
| 2004/0081115 | A1* | 4/2004 | Parsa | H04B 1/7103 370/320 |
| 2007/0081532 | A1* | 4/2007 | Kim | H04B 1/7176 370/389 |
| 2007/0147542 | A1* | 6/2007 | Schmidt | H03M 13/251 375/298 |
| 2007/0195817 | A1* | 8/2007 | Denney | H04J 3/1682 370/468 |
| 2009/0125792 | A1* | 5/2009 | Lakkis | H04B 7/0617 714/783 |
| 2009/0285269 | A1* | 11/2009 | Zhang | H04B 1/70735 375/150 |
| 2010/0054223 | A1* | 3/2010 | Zhang | H04L 25/03343 370/338 |
| 2010/0080266 | A1* | 4/2010 | Zhang | H04J 13/102 375/140 |
| 2010/0086076 | A1* | 4/2010 | Lakkis | H04J 13/0014 375/285 |
| 2010/0112960 | A1* | 5/2010 | Shao | H04W 52/0225 455/73 |
| 2010/0246600 | A1* | 9/2010 | Das | H04W 28/06 370/465 |
| 2010/0265922 | A1* | 10/2010 | Bracha | H04W 74/0808 370/336 |
| 2011/0194625 | A1* | 8/2011 | Hou-Shin | H04L 5/0048 375/257 |
| 2011/0274204 | A1* | 11/2011 | Ko | H04L 1/0057 375/295 |
| 2014/0314137 | A1* | 10/2014 | Lakkis | H04L 25/03006 375/232 |
| 2015/0244428 | A1 | 8/2015 | Lee et al. | |
| 2015/0281116 | A1 | 10/2015 | Ko et al. | |
| 2015/0365318 | A1* | 12/2015 | Liu | H04L 45/04 709/239 |
| 2016/0164800 | A1* | 6/2016 | Eitan | H04L 47/80 370/389 |
| 2017/0033909 | A1* | 2/2017 | Kasher | H04L 5/0053 |
| 2017/0223571 | A1* | 8/2017 | Ghosh | H04W 28/06 |
| 2017/0302402 | A1* | 10/2017 | Cordeiro | H04L 1/0003 |
| 2017/0353196 | A1* | 12/2017 | Ko | H04H 20/71 |
| 2018/0013480 | A1* | 1/2018 | Lomayev | H04L 69/323 |
| 2018/0227734 | A1* | 8/2018 | Lee | H04W 4/80 |

\* cited by examiner

FIG. 5

| Bits: 4 | 1 | 20 | 2 | 1 | 4 |
|---|---|---|---|---|---|
| Scrambler seed ID | Frame aggregation | Frame length | Low-latency mode | PCES | Reserved |

FIG. 7A

| Bits: 4 | 1 | 23 | 4 |
|---|---|---|---|
| Scrambler seed ID | Aggregation | Frame length | Reserved |

FIG. 7B

| Bits: 4 | 1 | 22 | 1 | 4 |
|---|---|---|---|---|
| Scrambler seed ID | Aggregation | Frame length | Pilot symbol | Reserved |

FIG. 7C

| Bits: 4 | 1 | 22 | 3 | 2 |
|---|---|---|---|---|
| Scrambler seed ID | Aggregation | Frame length | Pilot symbol | Reserved |

FIG. 10

| Bits: 4 | 1 | 4 | 20 | 1 | 2 | 1 | 2 | 1 | 4 |
|---|---|---|---|---|---|---|---|---|---|
| Scrambler seed ID field | Frame aggregation field | MCS field | Frame length field | Low-latency mode field | Pilot word length field | PCES field | Bonded channel number field | MIMO field | Reserved field |

FIG. 11

| Octets: 2 | 2 | 1 | 1 | 3 | 1 |
|---|---|---|---|---|---|
| Frame control | Pairnet ID | DestID | SrcID | ACK -related information | Reserved |

(10 octets)

US 10,136,287 B2

METHOD AND APPARATUS FOR CLOSE PROXIMITY COMMUNICATIONS

CROSS-REFERENCE TO RELATED APPLICATION(S)

This application claims the priority benefit of Korean Patent Application No. 10-2015-0098031 filed on Jul. 9, 2015, Korean Patent Application No. 10-2015-0127287 filed on Sep. 8, 2015, Korean Patent Application No. 10-2015-0127301 filed on Sep. 8, 2015, Korean Patent Application No. 10-2015-0155387 filed on Nov. 5, 2015, Korean Patent Application No. 10-2015-0155393 filed on Nov. 5, 2015, Korean Patent Application No. 10-2016-0087126 filed on Jul. 8, 2016, and Korean Patent Application No. 10-2016-0087178 filed on Jul. 8, 2016, in the Korean Intellectual Property Office, the disclosures of which are incorporated herein by reference for all purposes.

BACKGROUND

1. Field

One or more example embodiments relate to a method and apparatus for close-proximity communication.

2. Description of Related Art

Technology for a transmission in a 60 gigahertz (GHz) band, for example, an existing 802.15.3c standard technology, may support a transmission only in a single channel. The 802.15.3c standard technology may not support channel bonding or multiple-input and multiple-output (MIMO) communication for a higher throughput in close-proximity communication.

SUMMARY

According to an aspect, there is provided a close-proximity communication method performed by a transmitter, the method including generating a physical layer (PHY) frame including a PHY preamble, a frame header, and a payload field, and transmitting the generated PHY frame to a receiver.

The frame header may include a PHY header, a media access control (MAC) header, a header check sequence (HCS), and a Reed-Solomon (RS) parity bit.

The transmitter may perform channel bonding on a plurality of channels to bond the channels, and communicate with the receiver.

In the channel bonding, the channels to be used for the channel bonding may be determined based on the number of channels to be bonded.

The PHY preamble may include a frame synchronization (SYNC) field, a start frame delimiter (SFD) field, and a channel estimation sequence (CES) field. In the PHY preamble, the SYNC field, the SFD field, and the CES field may be repeated by the number of bonded channels.

The SYNC field may include information on synchronization, the SFD field may include information on at least one of a start of the PHY frame, a spreading factor, and the number of channels used for the channel bonding, and the CES field may include information for channel estimation.

When the transmitter uses a low-complexity (LC) PHY and the channel bonding, and does not use multiple-input and multiple-output (MIMO) communication, the PHY preamble may include the CES field, the SFD field, and the SYNC field that are repeated by the number of bonded channels, or include the SFD field and the SYNC field that are repeated by the number of the bonded channels.

When the transmitter uses the LC PHY and the channel bonding, and does not use the MIMO communication, the frame header may include information on at least one of a delimiter of a scrambler seed, whether frame aggregation is used, and a length of a MAC frame body.

The PHY preamble may include information on at least one of the number of the bonded channels to be used for a transmission of the PHY frame, and of the spreading factor.

The frame header may further include information on whether a pilot symbol is used.

According to another aspect, there is provided a transmitter including a processor configured to generate a PHY frame including a PHY preamble, a frame header, and a payload field, and a communicator configured to transmit the generated PHY frame to a receiver.

According to still another aspect, there is provided a close-proximity communication method performed by a receiver, the method including receiving, from a transmitter, a PHY frame including a PHY preamble, a frame header, and a payload field, and obtaining information from the received PHY frame.

According to yet another aspect, there is provided a receiver including a communicator configured to receive, from a transmitter, a PHY frame including a PHY preamble, a frame header, and a payload field, and a processor configured to obtain information from the received PHY frame.

According to further another aspect, there is provided a close-proximity communication method performed by a transmitter, the method including generating a PHY frame including an HCS field including information associated with a header check, and a parity bit field including information for correcting an error occurring in a transmission of the PHY frame, and transmitting the PHY frame to a receiver. A spreading factor of a header of the PHY frame may be a multiple of 2.

BRIEF DESCRIPTION OF THE DRAWINGS

FIG. 5 is a diagram illustrating a structure of a header of an LC PHY that uses channel bonding and MIMO communication according to an example embodiment.

FIG. 7A is a diagram illustrating a structure of a header of an LC PHY according to an example embodiment.

FIG. 7B is a diagram illustrating an example of a structure of a header of an LC PHY that includes a pilot symbol field according to an example embodiment.

FIG. 7C is a diagram illustrating another example of a structure of a header of an LC PHY that includes a pilot symbol field according to an example embodiment.

FIG. 10 is a diagram illustrating a structure of a header of an HR PHY that uses channel bonding and MIMO communication according to an example embodiment.

FIG. 11 is a diagram illustrating a structure of an MAC header field included in a PHY frame of an LC PHY according to an example embodiment.

DETAILED DESCRIPTION

Figure 1A:
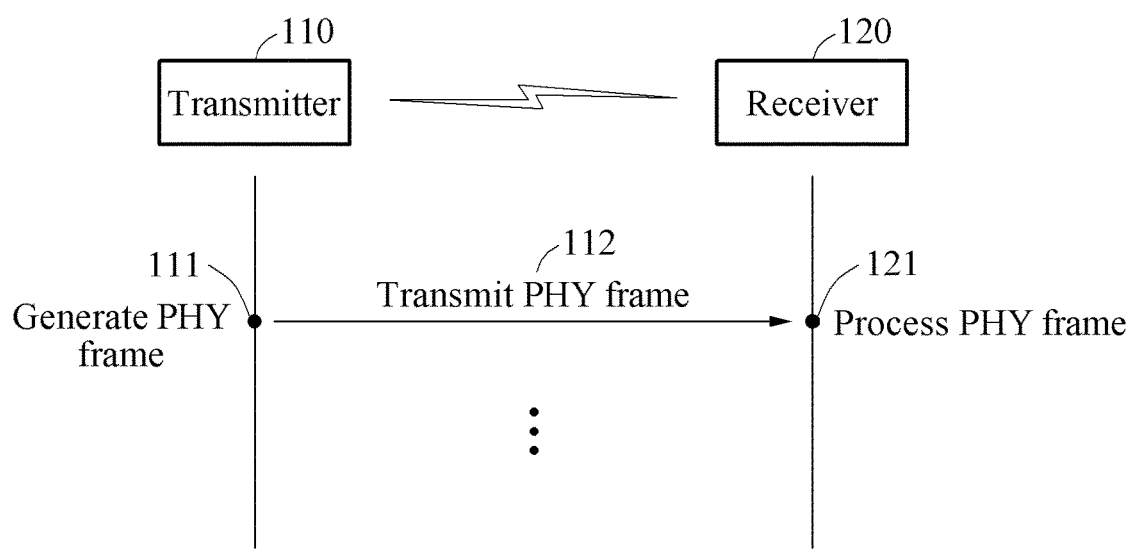
FIG. 1A is a diagram illustrating an overall configuration of a system for close-proximity communication according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings. Like reference numerals in the drawings denote like elements, and a known function or configuration will be omitted herein.

FIG. 1A is a diagram illustrating an overall configuration of a system for close-proximity communication according to an example embodiment.

A structure of a physical layer (PHY) frame is provided herein for a high-speed peer-to-peer (P2P) transmission between two terminals located in close proximity to each other. The high-speed P2P transmission may be achieved by supporting channel bonding or multiple-input and multiple-output (MIMO) communication. A close proximity used herein may refer to a distance less than or equal to 10 centimeters (cm). The provided structure of a PHY frame may support 802.15.3e standard communication technology.

In 60 gigahertz (GHz) band wireless personal area network (WPAN) technology, for example, the 802.15.3e standard communication technology, the provided structure of a PHY frame may support the channel bonding and the MIMO communication to support a higher throughput. The 802.15.3e standard communication technology may enable ultrahigh-speed multimedia data download when a user tag is come near a kiosk or a touch gate.

Referring to FIG. 1A, in stage 111, a transmitter 110 generates a signal including a PHY frame including a preamble, a frame header, and a payload field. In stage 112, the transmitter 110 transmits the generated signal to a receiver 120 in close proximity. The signal may include a media access control (MAC) frame and the PHY frame. In stage 121, the receiver 120 processes the PHY frame. By processing the PHY frame, the receiver 120 obtains information required for close-proximity communication.

The transmitter 110 or the receiver 120 may be an electronic product that supports close-proximity communication. The transmitter 110 or the receiver 120 may include, for example, a cellphone and a camera, a home appliance such as a television (TV) and a refrigerator, and a vehicle.

The transmitter 110 may modulate a certain field while generating the PHY frame. Based on a modulation method, the PHY frame may be classified into two types. The modulation method may be an on-off keying (OOK) modulation or a high-rate (HR) modulation. The HR modulation may include, for example, binary phase shift keying (BPSK), quadrature phase shift keying (QPSK), 64-quadrature amplitude modulation (QAM), 16-QAM, 256-QAM, and 1024-QAM. The OOK modulation may also be referred to as a low-complexity (LC) modulation. A PHY frame for which the OOK modulation is used may also be referred to as an LC PHY frame or an OOK PHY frame, and a PHY frame for which the HR modulation is used may also be referred to as an HR PHY frame.

The LC PHY frame may be readily embodied and be inexpensive, and more readily applicable to a product that requires a high throughput in comparison to an 802.15.3c standard. The HR PHY frame may support a phase-shift keying (PSK)-based modulation, and support a high data rate despite a high complexity. The channel bonding and the MIMO communication may be applicable to both the two types of the PHY frame. An LC PHY may use the channel bonding to improve a throughput, and the LC PHY frame may be readily embodied and be inexpensive, and be more readily applicable to a product that requires a high throughput in comparison to the 802.15.3c standard.

Technology for a transmission in a 60 GHz band, for example, an existing 802.15.3c standard technology, may support only a single-channel transmission without supporting a transmission using the MIMO communication, and may thus be restricted to improve a throughput. In contrast, according to example embodiments to be described hereinafter, the provided new structure of a PHY frame that supports the channel bonding or the MIMO communication may improve a throughput of a communication system.

Figure 1B:
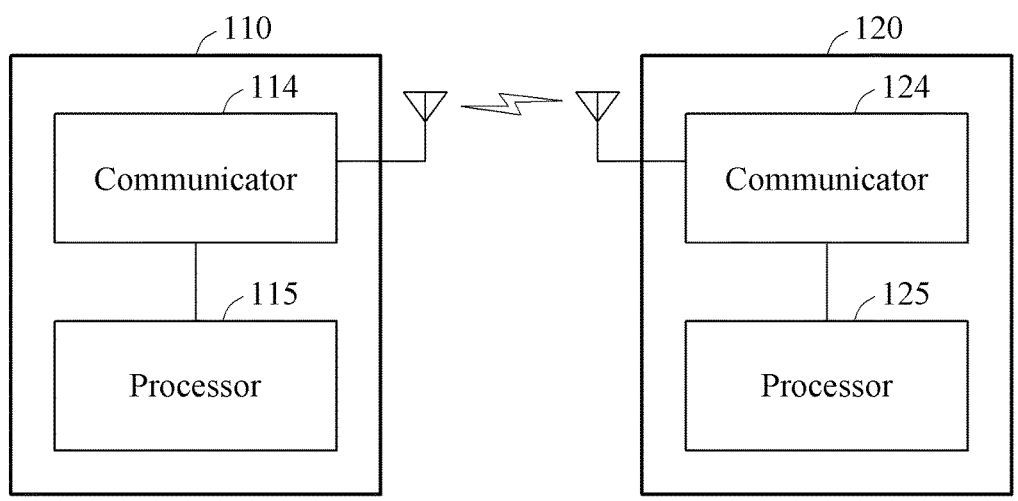
FIG. 1B is a diagram illustrating a configuration of a transmitter and a receiver for close-proximity communication according to an example embodiment.

FIG. 1B is a diagram illustrating a configuration of the transmitter 110 and the receiver 120 for close-proximity communication according to an example embodiment.

Referring to FIG. 1B, the transmitter 110 includes a communicator 114 and a processor 115.

The processor 115 of the transmitter 110 generates a PHY frame including a preamble, a frame header, and a payload field. The communicator 114 of the transmitter 110 transmits, to the receiver 120, the PHY frame generated by the processor 115.

The receiver 120 includes a communicator 124 and a processor 125.

The communicator 124 of the receiver 120 receives, from the transmitter 110, the PHY frame including the preamble, the frame header, and the payload field. The processor 125 of the receiver 120 obtains, from the received PHY frame, information required for close-proximity communication.

The preamble may include information on at least one of the number of bonded communication channels used for the transmission of the PHY frame, and of a spreading factor. The frame header may include information on at least one of whether to transmit the PHY frame using a frame aggregation mechanism, a total length of an MAC frame body, and whether a pilot symbol is used.

Figure 2A:
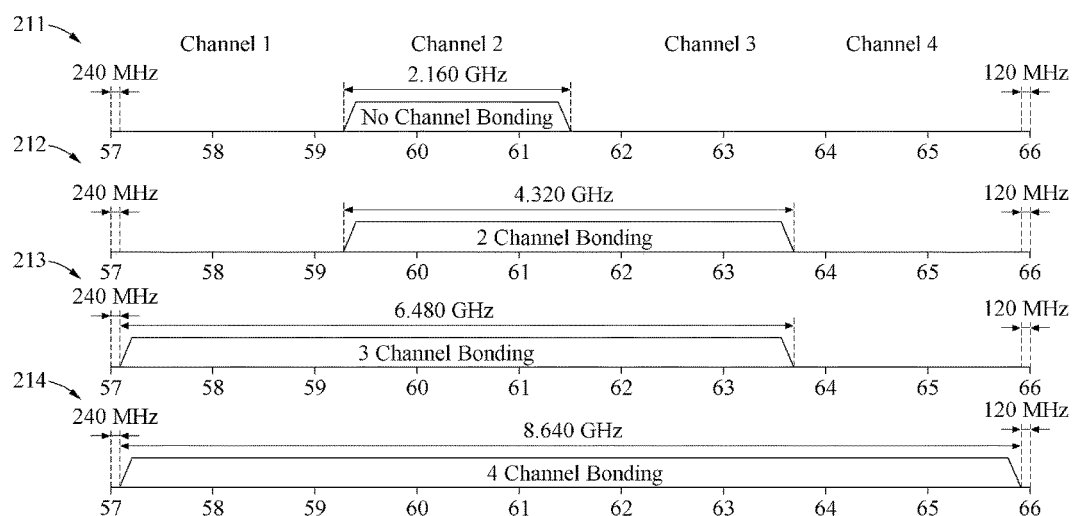
FIG. 2A is a diagram illustrating types of channel bonding according to an example embodiment.

FIG. 2A is a diagram illustrating types of channel bonding according to an example embodiment.

Referring to FIG. 2A, a 60 GHz band is divided into four 2.16 GHz single channels. The four single channels are identified as channel 1, channel 2, channel 3, and channel 4.

In channel state 211, channels used in existing communication technology are illustrated. The existing communication technology may use the four single channels obtained through the division of the 60 GHz band as shown in channel state 211. In channel state 211, one channel may use 1.76 GHz of 2.16 GHz.

According to an example embodiment, channel bonding may be used to support a higher rate. In channel states 212, 213, and 214, a channel state to which the channel bonding is applied is illustrated.

In channel state 212, channel 6 may be generated through the channel bonding applied to channel 2 and channel 3. In channel state 213, channel 8 may be generated through the channel bonding applied to channel 1, channel 2, and channel 3. In channel state 214, channel 9 may be generated through the channel bonding applied to channel 1, channel 2, channel 3, and channel 4.

According to an example embodiment, a certain single channel may be a default channel set to be included in all the channel states to which the channel bonding is applied. For example, as illustrated in FIG. 2A, channel 2 may be set to be the default channel, and thus be included in all the channel states 212, 213, and 214 to which the channel bonding is applied. The receiver 120 may permanently listen to the default channel, and thus detect the transmitter 110 more rapidly. When such a default channel is not set, the receiver 120 may need to scan all single channels, and thus spend more time in the detection.

According to an example embodiment, when using only one channel, only the default channel, for example, channel 2, may be used as illustrated in FIG. 2A. In addition, in a case of the channel bonding, only certain channels, for example, channels 2 and 3 for two-channel bonding, channels 1, 2, and 3 for three-channel bonding, and channels 1, 2, 3, and 4 for four-channel bonding, may be used. In such a case, once how many channels is to be bonded between two terminals is determined, which channel is to be used for a data transmission may be determined without an additional negotiation or signaling. That is, channels to be used for the channel bonding may be determined based on the number of channels to be bonded. For example, under the assumption of a communication range of less than 10 cm, all channels may be permanently available between two terminals, for example, a kiosk and a user terminal, without interference with another terminal adjacent to the terminals, and thus the channel bonding described in the foregoing may be used without a decrease in channel use efficiency.

Figure 2B:
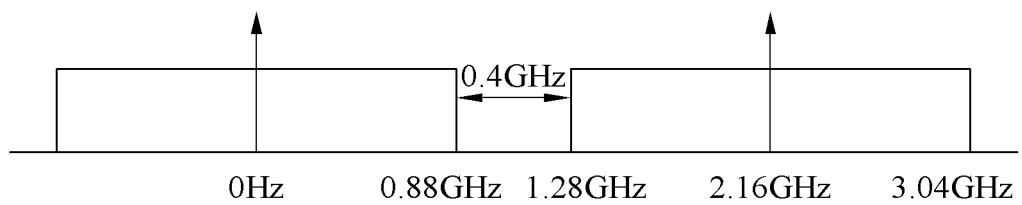
FIG. 2B is a diagram illustrating an example of channel aggregation-type channel bonding according to an example embodiment.
Figure 2C:
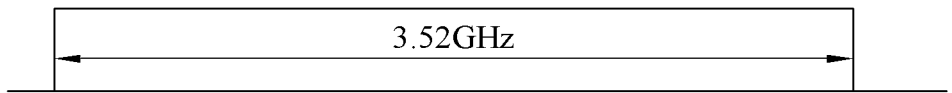
FIG. 2C is a diagram illustrating an example of two-channel (2X) bonding-type channel bonding according to an example embodiment.
Figure 2D:
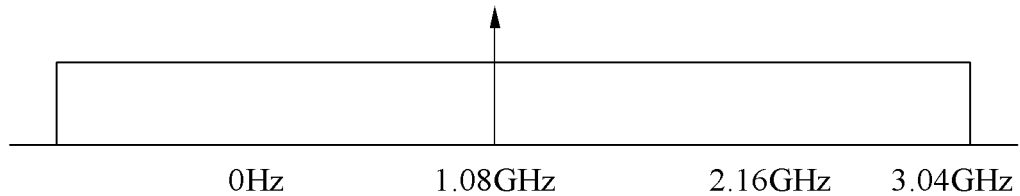
FIG. 2D is a diagram illustrating an example of 2.2X bonding-type channel bonding according to an example embodiment.

FIG. 2B is a diagram illustrating an example of channel aggregation-type channel bonding according to an example embodiment. FIG. 2C is a diagram illustrating an example of two-channel (2X) bonding-type channel bonding according to an example embodiment. FIG. 2D is a diagram illustrating an example of 2.2X bonding-type channel bonding according to an example embodiment.

Types of channel bonding may include a channel aggregation type, a 2X bonding type, and a 2.2X bonding type.

Referring to FIG. 2B, the channel aggregation-type channel bonding may non-contiguously bond 2.16 GHz single channels with a 0.4 GHz interval. For example, in a case of two-channel bonding, a chip rate may be 1.76×2=3.52 gigachip per second (Gchip/s). In such a manner, four single channels may be aggregated as illustrated in FIG. 2A.

Referring to FIG. 2C, the 2X bonding-type channel bonding may continuously bond two 1.76 GHz channels to use 3.52 Gchip/s. Here, 0.4 GHz may not be used. In such a manner, up to four single channels may be bonded as illustrated in FIG. 2A.

Referring to FIG. 2D, the 2.2X bonding-type channel bonding may use even 0.4 GHz. For example, in a case of two-channel 2.2X bonding, a chip rate may be 3.92 Gchip/s, and a widest bandwidth (BW) may be used. In such a manner, up to four single channels may be bonded as illustrated in FIG. 2A.

Figure 3A:
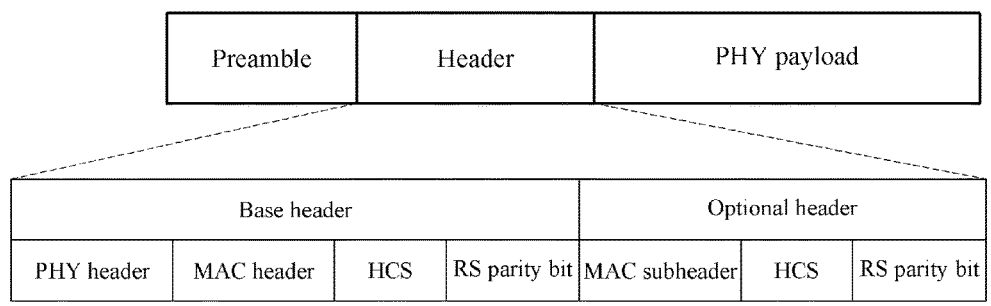
FIG. 3A is a diagram illustrating a structure of a physical layer (PHY) frame of a low-complexity (LC) PHY according to an example embodiment.

FIG. 3A is a diagram illustrating a structure of a PHY frame of an LC PHY according to an example embodiment.

Referring to FIG. 3A, a PHY frame of an LC PHY includes a PHY preamble, a frame header, and a PHY payload field.

The PHY preamble may include, as a signal generated in the PHY frame, information on at least one of the number of bonded communication channels to be used for a transmission of the PHY frame, and of a spreading factor. In addition, the PHY preamble may include information on, for example, automatic gain control (AGC), time synchronization, frequency synchronization, and frame synchronization, and may be used to demodulate a transmitted frame by a receiver when the receiver receives the frame.

The frame header may include information on at least one of whether to transmit the PHY frame using a frame aggregation mechanism, whether a pilot symbol is used, and a total length of an MAC frame body.

The frame header may include a base frame header field and an optional frame header field. The base frame header field may include a PHY header, a MAC header, a header check sequence (HCS), and Reed-Solomon (RS) parity bits. The optional frame header field may include RS parity bits, an HCS, and a MAC subheader.

The PHY payload field may include a portion of data that may be a basic target of a transmission, excluding information for close-proximity communication, for example, a header and metadata.

Figure 3B:
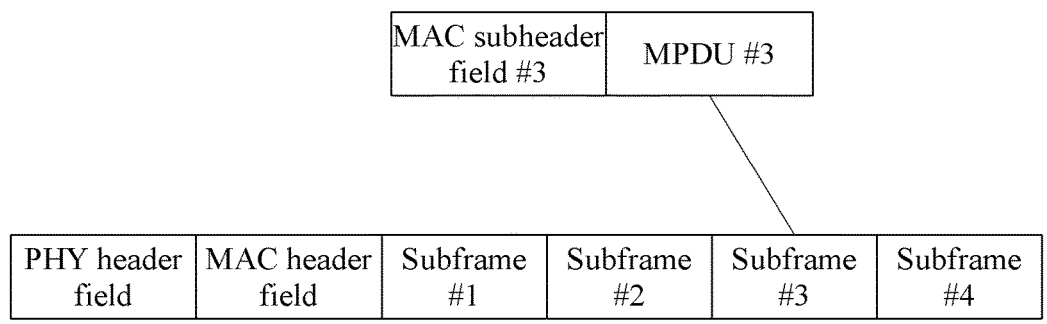
FIG. 3B is a diagram illustrating a process of rearranging a structure of a PHY frame of an LC PHY in a case of media access control (MAC) frame aggregation according to an example embodiment.
Figure 3C:
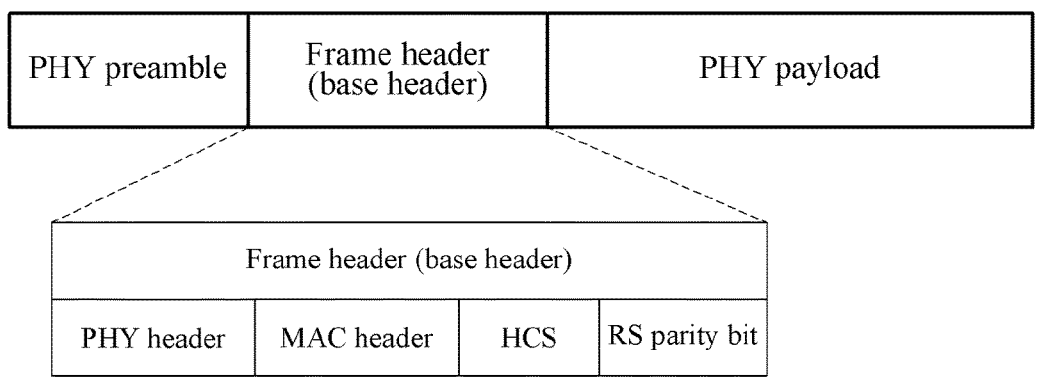
FIG. 3C is a diagram illustrating a rearranged structure of a PHY frame of an LC PHY in a case of PHY frame aggregation according to an example embodiment.

FIG. 3B is a diagram illustrating a process of rearranging a structure of a PHY frame of an LC PHY in a case of MAC frame aggregation according to an example embodiment. FIG. 3C is a diagram illustrating a rearranged structure of a PHY frame of an LC PHY in a case of MAC frame aggregation according to an example embodiment.

When aggregation is applied to a MAC frame, an optional frame header field included in a frame header may be rearranged in a PHY payload field. The PHY payload field may include a plurality of subframes. Here, the aggregation for the MAC frame may be performed by including a MAC subheader field in each subframe along with a MAC protocol data unit (MPDU) for each subframe.

For example, as illustrated in FIG. 3B, MPDU 3 and MAC subheader field 3 may be included in subframe 3 included in the PHY payload field. Also, in other subframes 1, 2, and 4, MPDUs and MAC subheader fields with identified numbers corresponding respectively to the subframes 1, 2, and 4 may be included. As a result, as illustrated in FIG. 3C, the optional frame header field may be included in the PHY payload field.

The frame header may include a PHY header, a MAC header, an HCS, and RS parity bits.

The PHY header included in the frame header may include information on at least one of whether to transmit a frame using a frame aggregation mechanism, whether a pilot symbol is used, and a total length of an MAC frame body. The PHY payload field may include a portion of data that may be a basic target of a transmission, excluding information for close-proximity communication, for example, a header and metadata. A method of processing an aggregated frame may be the same as a method of processing a general MAC frame body payload field, and may not be included in a method of processing a header.

Figure 4A:
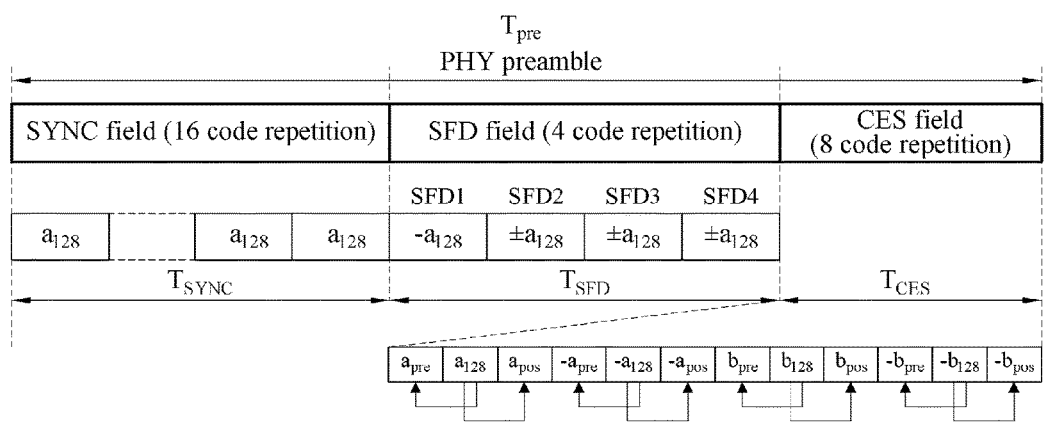
FIG. 4A is a diagram illustrating a structure of a preamble of an LC PHY that does not use channel bonding and multiple-input and multiple-output (MIMO) communication according to an example embodiment.

FIG. 4A is a diagram illustrating a structure of a preamble of an LC PHY that does not use channel bonding and MIMO communication according to an example embodiment.

Referring to FIG. 4A, the preamble includes a channel estimation sequence (CES) field, a start frame delimiter (SFD) field, and a frame synchronization (SYNC) field.

The CES field may be used for channel estimation. The CES field may include, for example, a Golay sequence $a_{128}$, $-a_{128}$, $b_{128}$, $-b_{128}$. A cyclic prefix, for example, a copy of the last 64 bits of a sequence, may be appended to a front of each sequence, and a cyclic postfix, for example, a copy of the first 64 bits of a sequence, may be appended to an end of each sequence.

The SFD field may be used for frame timing associated with a start of a PHY frame, or used to provide information on the number of antennas used for MIMO communication, the number of channels used for channel bonding, a BW, and a modulation and coding scheme (MCS). The SYNC field may include information associated with synchronization, and may be used for frame detection.

The processor 115 of the transmitter 110 of FIG. 1B may spread the preamble by repeating each bit based on a spreading factor. The spreading factor may be 1, 2, or greater. For example, the spreading factor may be 16. The processor 115 may then perform OOK modulation on the spread preamble. The communicator 114 of the transmitter 110 of FIG. 1B may transmit the modulated preamble at a preset chip rate. Each field of the preamble may be transmitted by the communicator 114 in order of the SYNC field, the SFD field, and the CES field.

Table 1 below illustrates examples of a 128 bit Golay sequence, for example, $a_{128}$ and $b_{128}$. The SYNC field, the SFD field, and the CES field of the preamble may be embodied by the 128 bit Golay sequence.

TABLE 1

| Sequence name | Sequence value |
| --- | --- |
| $a_{128}$ | 0x0536635005C963AFFAC99CAF05C963AF |
| $b_{128}$ | 0x0A396C5F0AC66CA0F5C693A00AC66CA0 |

According to an example embodiment, the Golay sequence $a_{128}$ may be used in the SYNC field, and a 16 code repetition may be used for robustness. The Golay sequence $a_{128}$ and the Golay sequence $b_{128}$ may be used in the SFD field, and a 4 code repetition may be used for robustness. In addition, a 8 code repetition may be used in the CES field for robustness.

Figure 4B:
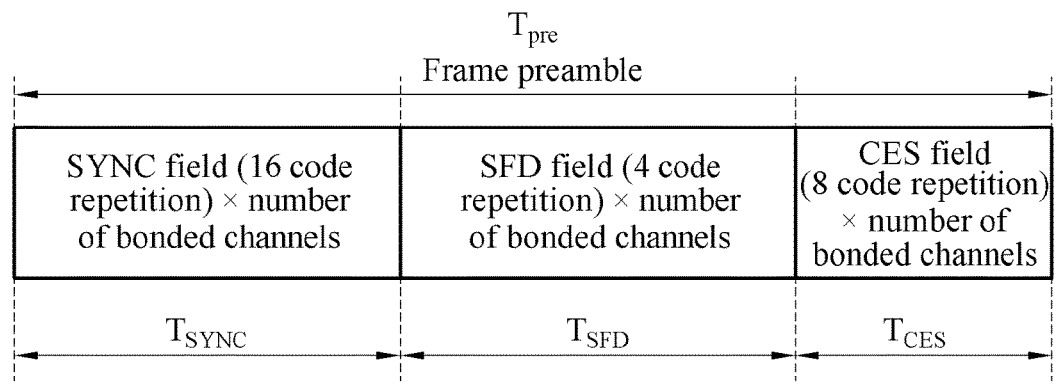
FIG. 4B is a diagram illustrating a structure of a preamble of an LC PHY that supports channel bonding and MIMO communication according to an example embodiment.

FIG. 4B is a diagram illustrating a structure of a preamble of an LC PHY that supports channel bonding and MIMO communication according to an example embodiment.

When channel bonding is applied, a data rate may increase and an amount of a reception time for receiving a preamble by the receiver 120 may decrease. According to an example embodiment, the transmitter 110 may repeat a certain field in a PHY frame to allow the receiver 120 to robustly process the preamble. The transmitter 110 may repeat the field by the number of bonded channels. For example, in a case of using the channel bonding, a PHY preamble may include an SYNC field, an SFD field, and a CES field, which are included in a structure of a PHY preamble in a case that the channel bonding is not used as illustrated in FIG. 4A, and the SYNC field, the SFD field, and the CES field may be repeated by the number of bonded channels. Thus, a reception time in a case of transmitting a preamble through a single channel to which the channel bonding is not applied may be maintained to be the same as a reception time in a case of transmitting a preamble through a bonded channel. For example, an amount of a reception time for receiving a preamble may be the same in all cases, for example, a single channel, two-channel bonding, three-channel bonding, and four-channel bonding. That is, $T_{SYNC}$, $T_{SFD}$, and $T_{CES}$ illustrated in FIG. 4B may be the same as $T_{SYNC}$, $T_{SFD}$, and $T_{CES}$ in a case that the channel bonding is not used, and $T_{pre}$ ($=T_{SYNC}+T_{SFD}+T_{CES}$) illustrated in FIG. 4B may become the same as $T_{pre}$ ($=T_{SYNC}+T_{SFD}+T_{CES}$) in a case that the channel bonding is not used.

For example, in a case of two-channel bonding, the repetition may be performed to represent an 8 code repetition sequence twice in succession in the CES field, represent a 4 code repetition sequence twice in succession in the SFD field, and represent a 16 code repetition sequence twice in succession in the SYNC field.

In a case of a MIMO communication transmission, the CES field that is repeated by the number of antennas may be included in a preamble. When the MIMO communication is not used, the CES field may not be included in the preamble, or only one CES field may be included in the preamble. Conversely, when the MIMO communication is used, the number of CES fields corresponding to the number of antennas may be included in the preamble.

In such a case, for example, a single carrier transmission, when a station (STA) is associated to a device that transmits a beacon, for example, an access point (AP) and a kiosk, a bandwidth (BW) to be used by a corresponding terminal, for example, information as to whether the channel bonding is used and information on the number of channels to be bonded, may be informed, and an associated terminal may then transmit a frame to the corresponding terminal based on the BW informed at a time of the transmission.

The SFD field may be used for frame timing, or used to provide information on the number of antennas, a BW, and an MCS. For the frame timing, the SFD field may be used as a start frame delimiter. In addition, before receiving the CES field and a header, the receiver 120 may receive the SFD field and obtain the information on the number of antennas, the BW, and the MCS included in the SFD field. For example, a first bit of the SFD field may provide information on the start frame delimiter, and simultaneously provide information as to whether the CES field is included.

For example, the first bit of the SFD field being $-a_{128}$ may indicate that the SFD field is the delimiter, and indicate an absence of the CES field. The first bit of the SFD field being $-b_{128}$ may indicate that the SFD field is the delimiter, and indicate a presence of the CES field. In addition, based on a second, a third, and a forth bit of the SFD field, the receiver 120 may verify MCS information illustrated in Table 2 below.

TABLE 2

| SFD pattern (SFD2, SFD3, SFD4) | OOK MCS |
|---|---|
| +a +a +a | 0 |
| +a +a −a | 1 |
| +a −a +a | 2 |
| +a −a −a | 3 |
| −a +a +a | 4 |
| −a +a −a | 5 |
| −a −a +a | 6 |
| −a −a −a | 7 |
| +b +b +b | 8 |
| +b +b −b~−b −b −b | Reserved |

When the MCS information is verified, the receiver 120 may verify the number of antennas used for the transmission performed by the transmitter 110, and also verify the number of CES fields to be received, a BW, a chip rate, a data rate, a modulation method, a spreading factor, a forward error correction (FEC) type, the number of bonded channels, and the like.

TABLE 3

| MCS identifier | Chip rate | Data rate (Mb/s) | Modulation | Spreading factor | FEC type | Bonding | MIMO | |
|---|---|---|---|---|---|---|---|---|
| 0 | 1760 | 825 | OOK | 2 | RS(255, 239) | 1 | 1 | 255 |
| 1 | 1760 | 1650 | OOK | 1 | RS(255, 239) | 1 | 1 | 255 |
| 2 | 1760 | 3299 | OOK | 1 | RS(255, 239) | 1 | 2 | 255 |
| 3 | 3920 | 3674 | OOK | 1 | RS(255, 239) | 2 | 1 | 255 |
| 4 | 3920 | 7348 | OOK | 1 | RS(255, 239) | 2 | 2 | 255 |
| 5 | 6080 | 5699 | OOK | 1 | RS(255, 239) | 3 | 1 | 255 |
| 6 | 6080 | 11397 | OOK | 1 | RS(255, 239) | 3 | 2 | 255 |
| 7 | 8240 | 7723 | OOK | 1 | RS(255, 239) | 4 | 1 | 255 |

By obtaining such information before receiving a field to be transmitted after the SFD field of the PHY frame, the receiver 120 may prepare for reception of a frame using a corresponding MCS. Since MCS-related information is already included in the SFD field, bits of a field indicating the MCS-related information in a frame header may be reduced.

Figure 4C:
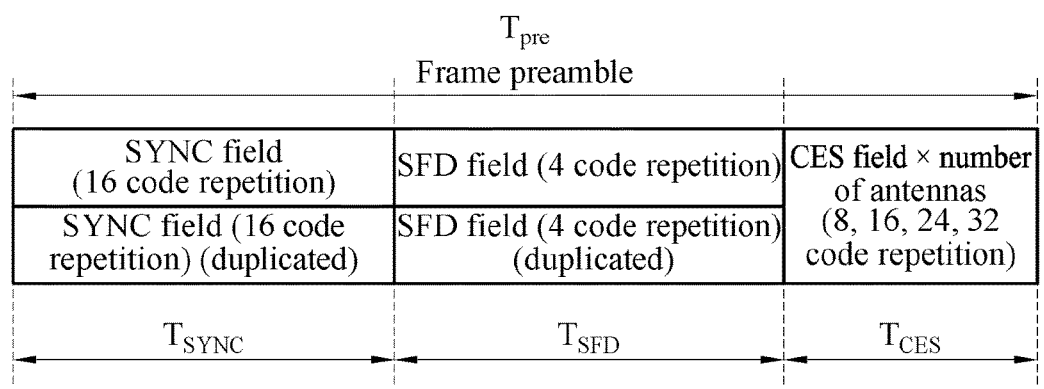
FIG. 4C is a diagram illustrating a structure of a preamble of an LC PHY in response to two-channel bonding when using channel bonding and MIMO communication according to an example embodiment.

FIG. 4C is a diagram illustrating a structure of a preamble of an LC PHY in response to two-channel bonding when using a multi-carrier transmission, channel bonding, and MIMO communication according to an example embodiment.

An orthogonal frequency-division multiplexing (OFDM) may be used for the multi-carrier transmission. In the multi-carrier transmission, SFD fields and SYNC fields corresponding to the number of bonded channels may be duplicated in each subchannel. FIG. 4C illustrates an example of the multi-carrier transmission to which the two-channel bonding is applied.

Dissimilar to a single carrier transmission, in a case of the multi-carrier transmission, an SFD field and an SYNC field may be duplicated in each subchannel. In a case of a single channel to which channel bonding is not applied, a 4 code repetition may be applied to the SFD field and a 16 code repetition may be applied to the SYNC field. In contrast, in a case of the channel bonding, a structure of a 4 code repetition and a 16 code repetition may be duplicated in each subchannel as illustrated in FIG. 4C.

Thus, although the transmitter 110 does not provide information on a BW in advance, the receiver 120 may perceive information on the BW. That is, the receiver 120 may listen to one of the single channel first, and receive the SFD field and the SYNC field even when listening to the single channel. Since the information on the BW is included in the SFD field, the receiver 120 may receive data to be transmitted to all the bonded channels after a CES field.

Similarly to the single carrier, in a case of the CES field, an 8 code repetition may be repeated by the number of bonded channels. For example, in the two-channel bonding, the 8 code repetition may be transmitted twice in succession using a BW corresponding to two channels. In addition, the CES field that is repeated by the number of antennas may be transmitted.

FIG. 5 is a diagram illustrating a structure of a header of an LC PHY that uses channel bonding and MIMO communication according to an example embodiment. Referring to FIG. 5, the header includes a scrambler seed identifier (ID) field, a frame aggregation field, a frame length field, a low-latency mode field, a pilot channel estimation sequence (PCES) field, and a reserved field.

The scrambler seed ID field may include information on a delimiter of a scrambler seed. The frame aggregation field may be set to be 1 when frame aggregation is used, and to be 0 when the frame aggregation is not used. The frame length field may include information on a size excluding a frame check sequence (FCS) of a frame body excluding a header of an MAC frame, with a unit of byte, and may be set to be 0 when the frame aggregation is applied. The low-latency mode field may be set to be 1 when a low-latency aggregation mode is used, and otherwise to be 0. The PCES field may be set to be 1 when a PCES is used in a preamble, and to be 0 when the PCES is not used in the preamble.

Since an SFD field already includes MCS-related information, the MCS-related information may not be included in the header. The SFD field includes the MCS-related information, and thus a bit of a field indicating the MCS-related information of the header may be reduced.

Figure 6A:
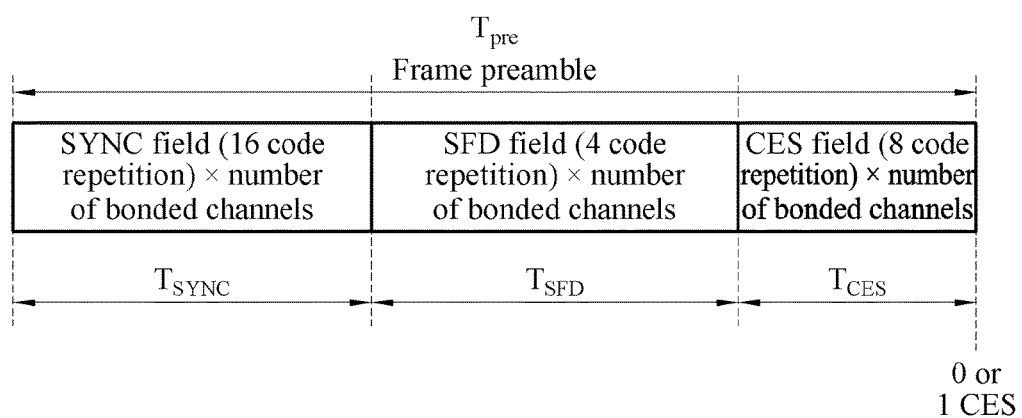
FIG. 6A is a diagram illustrating a structure of a preamble of an LC PHY that uses channel bonding and does not use MIMO communication according to an example embodiment.

FIG. 6A is a diagram illustrating a structure of a preamble of an LC PHY that uses channel bonding and does not use MIMO communication according to an example embodiment.

The structure illustrated in FIG. 6A is different from the structure illustrated in FIG. 4B in that the MIMO communication is not used. Since the MIMO communication is not used, information on the number of antennas may not be needed, and thus types of an MCS may be reduced. Since the MIMO communication is not used, a CES field may be one or absent. Another portion of the illustrated structure may be identical to a structure of a preamble using the MIMO communication.

Figure 6B:
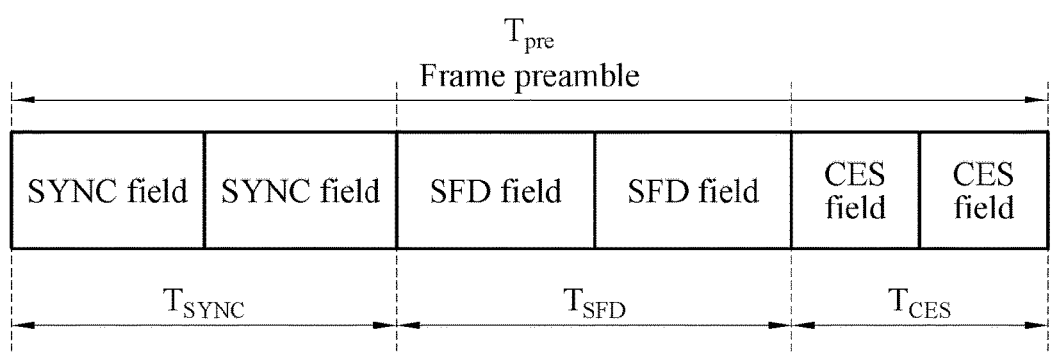
FIG. 6B is a diagram illustrating a structure of a preamble of an LC PHY in response to two-channel bonding when using channel bonding without using MIMO communication according to an example embodiment.

FIG. 6B is a diagram illustrating a structure of a preamble of an LC PHY in response to two-channel bonding when using channel bonding without using MIMO communication according to an example embodiment.

FIG. 6B illustrates an example of the structure illustrated in FIG. 6A to which the two-channel bonding is applied. According to an example embodiment, the transmitter 110 may repeat a certain field of a PHY frame to allow the receiver 120 to robustly process the preamble. The transmitter 110 may repeat the field by the number of bonded channels. Thus, a reception time in a case of transmitting a preamble through a single channel to which channel bonding is not applied may be maintained to be the same as a reception time in a case of transmitting a preamble through a bonded channel. That is, $T_{SYNC}$, $T_{SFD}$, and $T_{CES}$ illustrated in FIG. 6B may be the same as $T_{SYNC}$, $T_{SFD}$, and $T_{CES}$ in a case that the channel bonding is not used, and $T_{pre}$ ($=T_{SYNC}+T_{SFD}+T_{CES}$) illustrated in FIG. 6B may become the same as $T_{pre}$ ($=T_{SYNC}+T_{SFD}+T_{CES}$) in a case that the channel bonding is not used. Thus, although a data rate increases due to the channel bonding, the receiver 120 may detect the preamble during the same time, and thus robustness may be ensured at a time of transmission.

In addition, a bit repetition that is applied mainly to spreading may be suitable for correcting an error of a frame. The preamble may be used for channel estimation. However, when a bit error associated with a CES field of the preamble is corrected when receiving the preamble, the channel estimation may not be appropriately performed. Thus, the transmitter 110 may repeat the preamble by each field unit as described in the foregoing, without simply applying the bit repetition, and thus accuracy in the channel estimation may be improved.

In a case that the channel bonding is used without using the MIMO communication, a method of representing an MCS and the number of bonded channels in an SFD field is shown in Table 4 below. Using an SFD 2, 3, and 4 pattern, information on the number of channels to be used for channel bonding and a spreading factor may be provided. The receiver 120 may receive information indicated in a second, a third, and a fourth bit of the SFD field, and may perceive the number of bonded channels to be used for a transmission performed by a counterpart terminal before receiving a latter portion of a PHY frame and also perceive the spreading factor in advance. Subsequently, the receiver 120 may prepare for reception of the frame. Since related information is signaled, in advance, in the SFD field, a bit indicating MCS-related information of a PHY header may be reduced.

TABLE 4

| SFD pattern (SFD2, SFD3, SFD4) | OOK MCS |
| --- | --- |
| +a +a +a | 0 (1 channel, SF = 1) |
| +a +a −a | 1 (2 channel, SF = 2) |
| +a −a +a | 2 (2 channel, SF = 1) |
| +a −a −a | 3 (3 channel, SF = 2) |
| −a +a +a | 4 (3 channel, SF = 1) |
| −a +a −a | 5 (4 channel, SF = 2) |
| −a −a +a | 6 (4 channel, SF = 1) |
| −a −a −a | Reserved |
| +b +b +b~−b −b −b | Reserved |

According to an example embodiment, as in a case that the MIMO communication is applied, a first bit of the SFD field may be used to indicate a start frame delimiter and a presence or an absence of a CES field. The first bit of the SFD field being $-a_{128}$ may indicate that the SFD field may be the delimiter, and indicate an absence of the CES field. The first bit of the SFD field being $-b_{128}$ may indicate that the SFD field may be the delimiter, and indicate a presence of the CES field. In addition, based on a second, a third, and a fourth bit of the SFD field, the receiver 120 may verify the number of bonded channels and a spreading factor from MCS information illustrated in Table 4 above.

A PHY frame may be transmitted, more robustly, through spreading. Types of the spreading may include a first-type spreading, a second-type spreading, and a third-type spreading. The first-type spreading may use a Golay sequence in a case of a spreading factor of 64 (SF=64). The second-type spreading may use a linear feedback shift register (LFSR) in a case of a spreading factor of 2, 4, 6, 8, 16, and 32 (SF=2, 4, 6, 8, 16, 32). The third-type spreading may be simply performed through a bit repetition. As an example of the third-type spreading in which a spreading factor is 2 (SF=2), when data of a frame to be transmitted is 10101010, the frame may be spread through a bit repetition of 1100110011001100.

In a case of an LC PHY using an OOK modulation, the second-type and the third-type spreading may be applied to a PHY frame of the LC PHY. The second-type spreading may enable a more robust transmission despite a complex process, and the third-type spreading may be more simply embodied with a less robustness.

According to an example embodiment, for a frame header, robustness may be important, and thus the PHY frame may be spread with a spreading factor of 16 (SF=16) using the LFSR, and then be spread with a spreading factor of 32 (SF=32) by additionally applying a bit repetition with a spreading factor of 2 (SF=2) performed on a result of the spreading using the LFSR with a spreading factor of 16 (SF=16). However, a channel state may be stable in close-proximity communication, and thus a spreading with a spreading factor of 16 (SF=16) using the LFSR may be appropriate. For a body portion of the PHY frame, a simple bit repetition with a spreading factor of 2 (SF=2) may be used for an effective process. When a spreading factor increases, robustness may increase despite an increase in a data length. When needed, an additional MCS may be defined using a reserved SFC pattern +b +b +b~-b -b -b.

When encoding the body portion of the PHY frame, a shorted RS code, RS (240, 224), may be used for channel coding. In such a case, a bit number to be processed at a time may be a multiple of 32 and processing by a 32 bit unit may be enabled, and thus more effective implementation may be enabled.

FIG. 7A is a diagram illustrating a structure of a header of an LC PHY according to an example embodiment.

Referring to FIG. 7A, the header of the LC PHY includes a scrambler seed ID field, an aggregation field, a frame length field, and a reserved field.

The scrambler seed ID field may include information associated with a delimiter of a scrambler seed.

The aggregation field may be set to be 1 when frame aggregation is used, and to be 0 when the frame aggregation is not used. Alternatively, the aggregation field may be omitted when a frame is set to be transmitted in a permanently aggregated form using a frame aggregation format even in a case of a single frame transmission.

The frame length field may indicate a length of a MAC frame body from which a header and a preamble are excluded. The frame length field may use a unit of octet. The length of the MAC frame body may include frame payload(s), MAC subheader(s) and padding octets in the aggregated frames, and FCS(s), and may not include the frame header and the preamble. The frame length field may use an unsigned integer. According to an example embodiment, a receiver may perceive a total length of a frame to be received from a transmitter based on only the frame length field of the PHY header.

In comparison to the structure of the header of the LC PHY using channel bonding and MIMO communication, which is illustrated in FIG. 5, a PCES field and a low-latency mode field may be omitted from the structure of the header of the LC PHY illustrated in FIG. 7A. Since a channel is stable in close-proximity communication, the PCES field may not need to be included. In addition, when using only one type of the frame aggregation, information associated with a frame aggregation mechanism, for example, a low-latency mode, may be omitted.

MCS-related information, for example, the number of bonded communication channels and a spreading factor when using an OOK PHY, may be included in an SFD field included in the preamble, and thus may not be included in the header. As described above, since the SFD field includes the MCS-related information, bits of a field indicating the MCS-related information in the PHY header may be reduced. Here, since an OOK method is permanently used for modulation, information on the modulation may not need to be provided separately, and a spreading factor may be indicated in the preamble.

According to an example embodiment, a PHY layer may use a pilot symbol when transmitting a frame. When the pilot symbol is used, a separate field indicating the use of the pilot symbol may not be included, similarly to the header of the LC PHY illustrated in FIG. 7A. For example, when the pilot symbol is permanently used, the separate field indicating the use of the pilot symbol may not be included. For another example, in a case of a single channel or two-channel bonding, equalization may be used less, and thus the pilot symbol may not be used for the single channel or the two-channel bonding. However, in a case of three-channel or four-channel bonding, the pilot symbol may be set to be included. In such a case, the separate field indicating the use of the pilot symbol may not need to be included.

The structure of the header of the LC PHY illustrated in FIG. 7A may be applied to a structure of a header of an LC PHY that uses channel bonding and does not use MIMO communication.

FIG. 7B is a diagram illustrating an example of a structure of a header of an LC PHY that includes a pilot symbol field according to an example embodiment. FIG. 7B illustrates another example of a PHY frame. Here, whether a pilot symbol is used may be explicitly indicated in a PHY header, and whether to include or exclude the pilot symbol in or from a frame to be transmitted may be determined as necessary.

Referring to FIG. 7B, the header of the LC PHY includes a pilot symbol field. The pilot symbol field may explicitly indicate whether a pilot symbol is used.

For example, the pilot symbol field may be 1 bit. When a bit of the pilot symbol field is 1, it may indicate that the pilot symbol is used. In contrast, when a bit of the pilot symbol field is 0, it may indicate that the pilot symbol is not used.

When a bit of the pilot symbol field is 1, a pilot symbol with a length set as a default may be used. For example, when a spreading factor is 1 (SF=1), a block size may be 512 and a length of a pilot symbol to be included herein may be 4. When a spreading factor is 2 (SF=2), a block size may be 1024 and a length of a pilot symbol to be included herein may be 8. When a spreading factor is n (SF=n), a block size may be 512×n and a length of a pilot symbol to be included herein may be 4×n.

When a bit of the pilot symbol field is 0, a pilot symbol may not be included in a frame to be transmitted.

The structure of the header of the LC PHY illustrated in FIG. 7B may be applied to a structure of a header of an LC PHY that uses channel bonding and does not use MIMO communication. For descriptions of fields other than the pilot symbol field, reference may be made to the description provided with reference to FIG. 7A.

FIG. 7C is a diagram illustrating another example of a structure of a header of an LC PHY that includes a pilot symbol field according to an example embodiment.

Referring to FIG. 7C, the header of the LC PHY includes a pilot symbol field. The pilot symbol field may explicitly indicate a length of a pilot symbol.

For example, when a value of the pilot symbol field is 1, a length of a pilot symbol may be 4. When a value of the pilot symbol field is 2, a length of the pilot symbol may be 8. When a value of the pilot symbol field is 3, a length of the pilot symbol may be 16. When a value of the pilot symbol field is 4, a length of the pilot symbol may be 32. When a value of the pilot symbol field is 5, a length of the pilot symbol may be 64 (by a bit unit).

When a value of the pilot symbol field is 0, the pilot symbol may not be included in a frame to be transmitted.

The structure of the header of the LC PHY illustrated in FIG. 7C may be applied to a structure of a header of an LC PHY that uses channel bonding and does not use MIMO communication. For descriptions of fields other than the pilot symbol field, reference may be made to the description provided with reference to FIG. 7A.

Figure 8A:
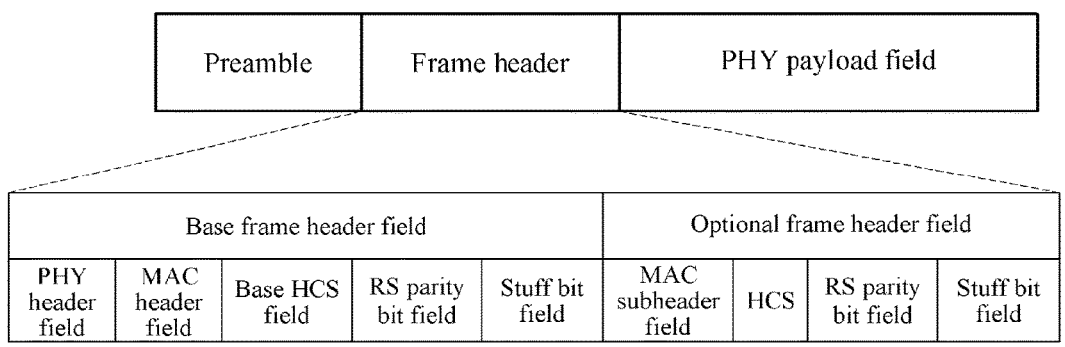
FIG. 8A is a diagram illustrating a structure of a PHY frame of a high-rate (HR) PHY according to an example embodiment.
Figure 8B:
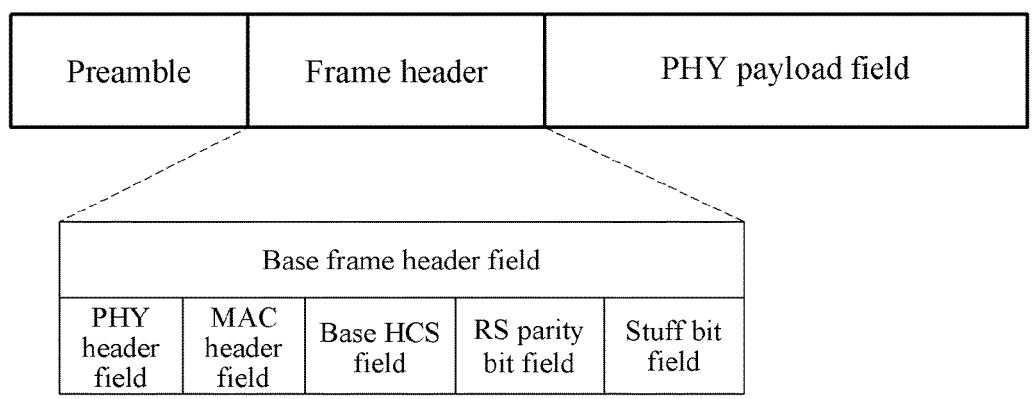
FIG. 8B is a diagram illustrating a rearranged structure of a PHY frame of an HR PHY in a case of PHY frame aggregation according to an example embodiment.

FIG. 8A is a diagram illustrating a structure of a PHY frame of an HR PHY according to an example embodiment. FIG. 8B is a diagram illustrating a rearranged structure of a PHY frame of an HR PHY in a case of PHY frame aggregation according to an example embodiment.

Referring to FIG. 8A, the PHY frame of the HR PHY includes a PHY payload field, a frame header, and a preamble.

The frame header includes an optional frame header field and a base frame header field. The optional frame header field includes an RS parity bit field, an HCS field, a stuff bit field, and a MAC subheader field. The base frame header field includes an RS parity bit field, a base HCS field, a stuff bit field, a MAC header field, and a PHY header field.

When aggregation is applied to a MAC frame, the optional frame header field included in the frame header may be rearranged in the PHY payload field as illustrated in FIG. 8B. The PHY payload field may include a plurality of subframes. Here, the aggregation to be applied to the MAC frame may be performed by including a MAC subheader field in each subframe along with an MPDU for each subframe.

Figure 9A:
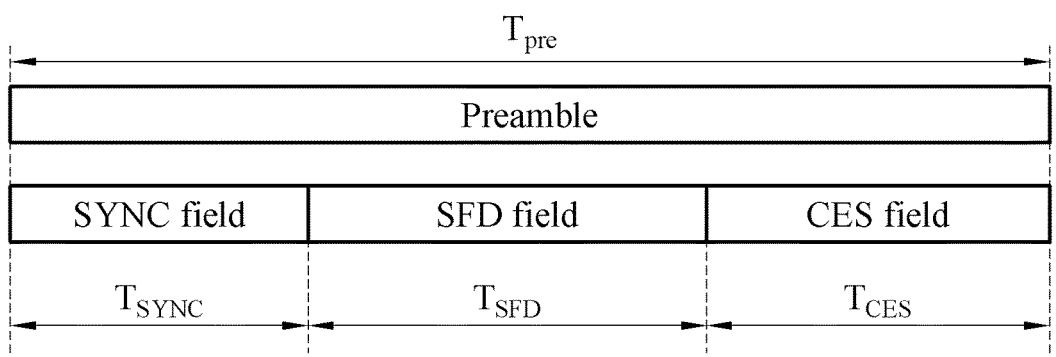
FIG. 9A is a diagram illustrating a structure of a preamble of an HR PHY that does not use channel bonding and MIMO communication according to an example embodiment.

FIG. 9A is a diagram illustrating a structure of a preamble of an HR PHY that does not use channel bonding and MIMO communication according to an example embodiment.

Referring to FIG. 9A, the preamble of the HR PHY may be similar to a preamble of an LC PHY. The preamble includes a CES field, an SFD field, and an SYNC field. The SYNC field, the SFD field, and the CES field may be transmitted in order.

The preamble of the HR PHY may be different from the preamble of the LC PHY in the following points. The preamble of the HR PHY may be spread by a spreading factor of 1 or 2 (SF=1 or 2) through a bit repetition, and then modulated by pi/2 BPSK, pi/2 QPSK, pi/2 16 QAM, pi/2 64 QAM, pi/2 256 QAM, and pi/2 1024 QAM.

In addition, each field of the preamble, the SYNC field, the SFD field, and the CES field, may be configured by a 128 bit Golay sequence of Table 1. In the SYNC field, a Golay sequence $a_{128}$ may be used, and a 14 code repetition may be used for robustness. In the SFD field, a Golay sequence $a_{128}$ may be used, and a 4 code repetition may be used for robustness. In the CES field, a 9 code repetition may be used for robustness, and a 9 code sequence may be [$b_{128}$ $b_{256}$ $a_{256}$ $b_{256}$ $a_{256}$].

Figure 9B:
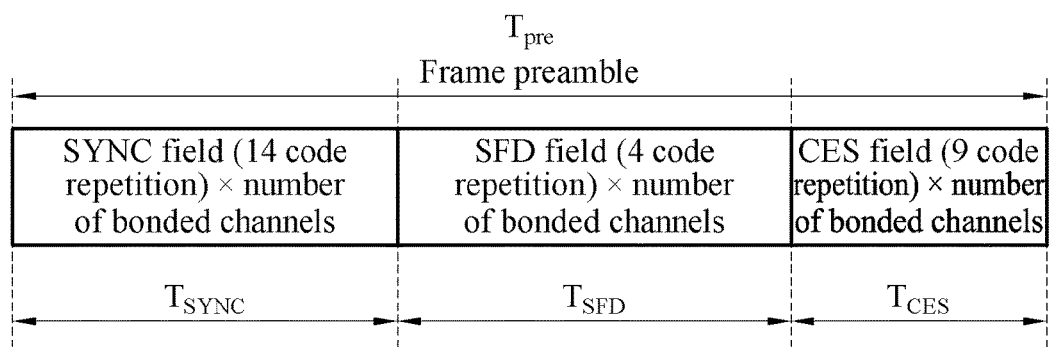
FIG. 9B is a diagram illustrating a structure of a preamble of an HR PHY that supports channel bonding and MIMO communication according to an example embodiment.

FIG. 9B is a diagram illustrating a structure of a preamble of an HR PHY that supports channel bonding and MIMO communication according to an example embodiment.

When the channel bonding is applied, a data rate may increase and an amount of a reception time for receiving the preamble by the receiver 120 may decrease. According to an example embodiment, the transmitter 110 may repeat a certain field in a PHY frame to allow the receiver 120 to robustly process the preamble. The transmitter 110 may repeat the field by the number of bonded channels. Thus, a reception time in a case of transmitting the preamble through a single channel to which the channel bonding is not applied may be maintained to be the same as a reception time in a case of transmitting the preamble through the bonded channels. For example, the reception time for receiving the preamble may be the same in all cases, for example, the single channel, two-channel bonding, three-channel bonding, and four-channel bonding.

For example, in a case of the two-channel bonding, the repetition may be performed to allow a 9 code repetition to be represented twice in succession in a CES field, a 4 code repetition to be represented twice in succession in an SFD field, and a 14 code repetition to be represented twice in succession in an SYNC field.

When the MIMO communication is not used, the CES field may not be present in the preamble, or one CES field may be present in the preamble. Conversely, when the MIMO communication is used, CES fields corresponding to the number of antennas may be included in the preamble.

In such a case, for example, a single carrier transmission, when a station (STA) is associated to a device that transmits a beacon, for example, an access point (AP) and a kiosk, a BW to be used by a corresponding terminal (the device), for example, information as to whether channel bonding is used and information on the number of channels to be bonded, may be provided, and an associated terminal (the STA) may transmit a frame to the corresponding terminal based on the BW provided at a time of the transmission.

The SFD field may be used for frame timing, and also used to provide information on the number of antennas and a BW. When the SFD field is used for the frame timing, the SFD field may be used as a start frame delimiter. Before receiving the CES field and a header, the receiver 120 may receive the SFD field, and obtain the information on the number of antennas and the BW that is included in the SFD field.

For example, a first bit of the SFD field may indicate the start frame delimiter using a +$a_{128}$ sequence. Based on a second, a third, and a fourth bit of the SFD field, the receiver 120 may verify the information on the number of antennas and the BW illustrated in Table 5 below. Thus, the receiver 120 may verify the number of antennas, and verify how many CES fields are to be received, the BW to be used, and the like.

TABLE 5

| SFD pattern (SFD2, SFD3, SFD4) | |
|---|---|
| +a +a +a | 1 stream, 1 channel |
| +a +a −a | 1 stream, 2 channel |
| +a −a +a | 1 stream, 3 channel |
| +a −a −a | 1 stream, 4 channel |
| −a +a +a | 2 stream, 1 channel |
| −a +a −a | 2 stream, 2 channel |
| −a −a +a | 2 stream, 3 channel |
| −a −a −a | 2 stream, 4 channel |

The receiver 120 may obtain such information before receiving a field to be transmitted after the SFD field of the PHY frame, and thus may prepare for reception for a transmission using a corresponding number of antennas and a corresponding BW. In addition, since the SFD field already includes information associated with the number of antennas and the number of bonded channels, bits of a field indicating related information in the frame header may be reduced.

Figure 9C:
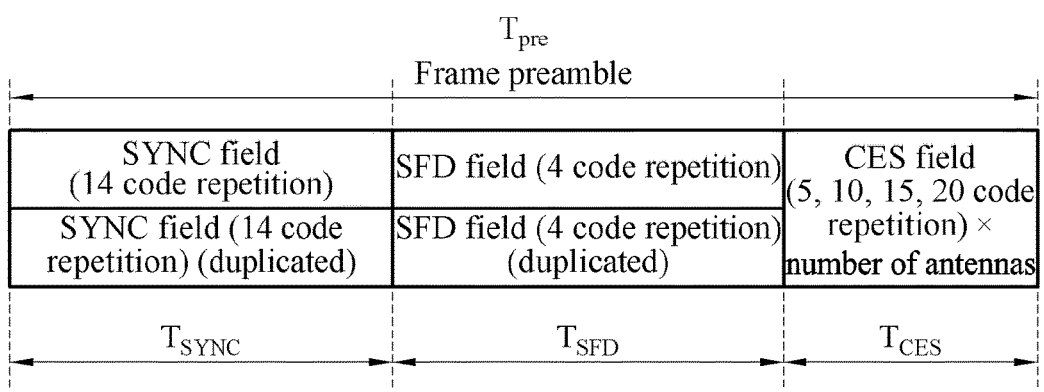
FIG. 9C is a diagram illustrating a structure of a preamble of an HR PHY in response to two-channel bonding when using channel bonding and MIMO communication according to an example embodiment.

FIG. 9C is a diagram illustrating a structure of a preamble of an HR PHY in response to two-channel bonding when using a multicarrier transmission, channel bonding, and MIMO communication according to an example embodiment.

A method, for example, OFDM, may be used for the multicarrier transmission. In the multicarrier transmission, an SFD field and an SYNC field that are repeated by the number of bonded channels may be duplicated in each sub channel. FIG. 9C illustrates an example of the multicarrier transmission to which two-channel bonding is applied.

Dissimilar to a single carrier transmission, in a case of the multicarrier transmission, the SFD field and the SYNC field may be duplicated in respective subchannels. In a case of a single channel to which the channel bonding is not applied, a 4 code repetition may be applied to the SFD field and a 14 code repetition may be applied to the SYNC field. In contrast, in a case that the channel bonding applied, structures of a 4 code repetition and a 14 code repetition may be duplicated in the respective subchannels as illustrated in FIG. 9C.

Thus, although the transmitter 110 does not provide information on a BW in advance, the receiver 120 may perceive the information on the BW. That is, the receiver 120 may listen to one of the single channel first, and receive the SFD field and the SYNC field even when listening to the single channel. The SFD field may include the information on the BW, and thus the receiver 120 may receive, starting from the CES field, data to be transmitted through all the bonded channels.

Similar to the single carrier, in the CES field, 9 codes may be repeated by the number of bonded channels. For example, in a case of the two-channel bonding, a 9 code repetition, $[b_{128}\ b_{256}\ a_{256}\ b_{256}\ a_{256}]$, may be transmitted twice in succession using a BW corresponding to two channels. In addition, CES fields corresponding to the number of antennas may be included to be transmitted.

FIG. 10 is a diagram illustrating a structure of a header of an HR PHY that uses channel bonding and MIMO communication according to an example embodiment.

Referring to FIG. 10, the header includes a scrambler seed ID field, a frame aggregation field, an MCS field, a frame length field, a low-latency mode field, a pilot word length field, a PCES field, a bonded channel number field, a MIMO field, and a reserved field.

The scrambler seed ID field may include information associated with a delimiter of a scrambler seed. The frame aggregation field may be set to be 1 when frame aggregation is used, and to be 0 when the frame aggregation is not used.

The MCS field may indicate information associated with an MCS of a frame including the MCS field.

The frame length field may include information associated with a size excluding an FCS of a frame body excluding a header of the MAC frame, by a unit of byte, and may be set to be 0 when the frame aggregation is applied.

The low-latency mode field may be set to be 1 when a low-latency aggregation mode is used, and to be 0 otherwise.

The pilot word length field may indicate a length of a pilot word.

The PCES field may be set to be 1 when a PCES is used in a preamble, and to be 0 when the PCES is not used in the preamble.

The MIMO field may indicate whether MIMO communication is used. For example, when two antennas are supported, the MIMO field being 0 may indicate that the MIMO communication is not used, and the MIMO field being 1 may indicate that the two antennas are used. When the number of antennas increases, a length of the MIMO field may increase to indicate the number of antennas to be used.

The bonded channel number field may indicate the number of bonded channels in the channel bonding.

Since information on whether the MIMO communication is used, the number of antennas, and the number of bonded channels is already included in an SFD field, the MIMO field or the bonded channel number field may be omitted.

FIG. 11 is a diagram illustrating a structure of an MAC header field included in a PHY frame of an LC PHY according to an example embodiment.

Referring to FIG. 11, the MAC header field includes a frame control field, a pairnet ID field, a destination ID (DestID) field, a source ID (SrcID) field, an acknowledgment (ACK) field, and a reserved field. A length of the MAC header field may be configured by 10 octets.

The frame control field may include information required for controlling the frame. The pairnet ID field may include information on an ID, for example, a pairnet ID, of a P2P network generated by a terminal functioning as a piconet coordinator (PNC), for example, a kiosk or an AP. The DestID field and the SrcID field may include information related to a destination address of the frame and information on a source address of the frame. The ACK field may include information on which type of ACK is used.

Figure 12A:
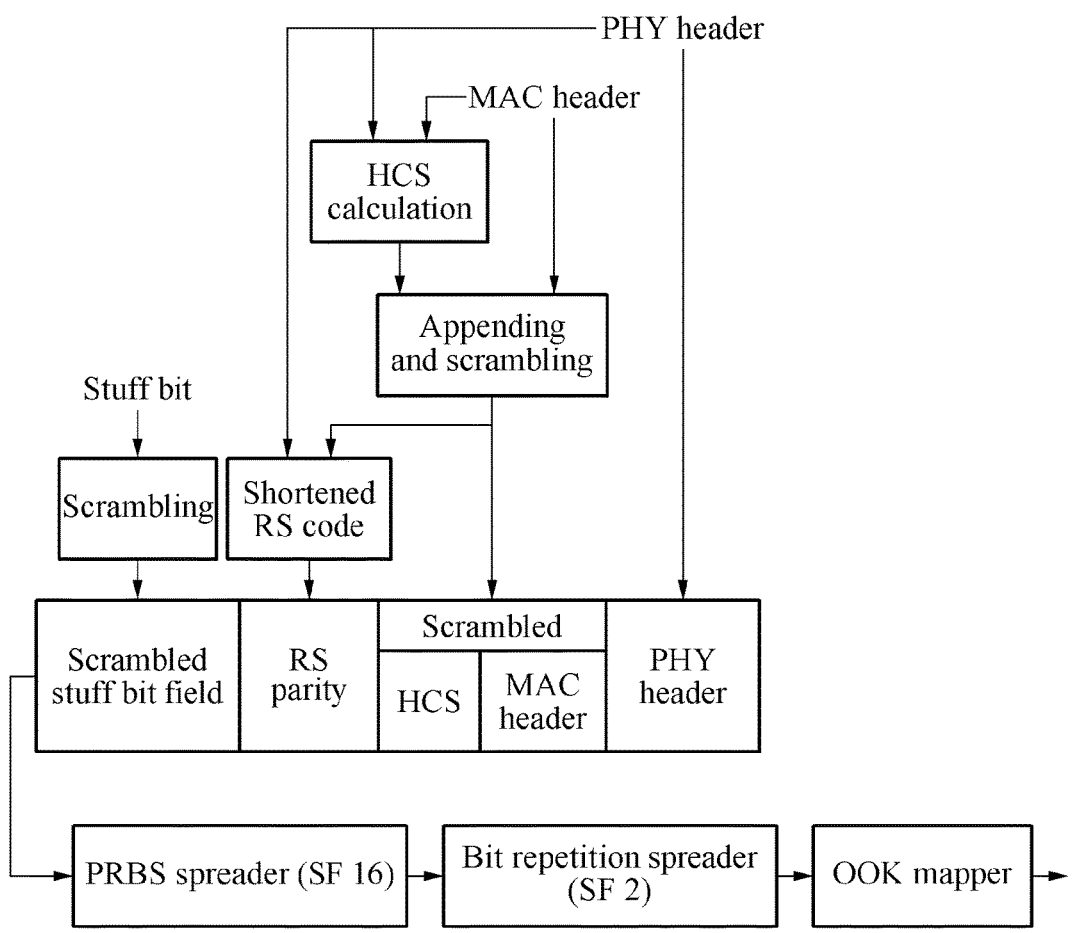
FIG. 12A is a diagram illustrating an example of a flow of a method of processing a base header field included in a PHY frame of an LC PHY according to an example embodiment.

FIG. 12A is a diagram illustrating a method of processing a base header field included in a PHY frame of an LC PHY according to an example embodiment.

Referring to FIG. 12A, the transmitter 110 may generate a PHY header field based on information provided from MAC. An HCS field may be generated based on a combination of the PHY header field and a MAC header field. The HCS field may be appended to an end of the MAC header field. The MAC header field appended with the HCS field may be scrambled. An HCS may be information associated with a header check.

The PHY header field, the scrambled MAC header field, and the scrambled HCS field may be encoded based on a shortened RS code, and an RS parity bit may be calculated based on a result of the encoding. An RS parity bit field including the RS parity bit may be appended to an end of the HCS field. The shortened RS code may use, for example, RS (240, 224), as a mother code. Here, RS may be in a form of (n+16, n), wherein "n" denotes an octet number of a combination of the combined PHY header field, the scrambled MAC header field, and the scrambled HCS field. Here, the RS parity bit may include information for correcting an error that may occur in a transmission of a PHY frame.

When needed, a stuff bit field may be inserted.

For example, a size of one block of a PHY frame to be finally generated may be a spreading factor×512 (SF×512) for a payload. For example, when the spreading factor is 1 or 2 (SF=1 or 2), the finally generated PHY frame may be divided into blocks of 512 bit or 1024 bit unit for the payload. For example, for a header, a size of one block may be permanently 512 bits irrespective of a spreading factor. A pilot word or a pilot symbol may be included in the front portion of each block which is used for, for example, timing tracking, compensation for a clock drift, compensation for a frequency offset error, and functions as a cyclic prefix for performing frequency-domain equalization.

In the process described in the foregoing, when a bit number of the generated result, for example, the PHY header field, the scrambled MAC header field, the scrambled HCS field, and the RS parity bit, is not a multiple of a bit number of a data portion to be included in one block, a stuff bit may be inserted into an end of the block to fill the last block. Here, when the pilot symbol is included in the block, a result obtained by subtracting a length of the pilot symbol from a size of the block may become a length of the data portion. When the stuff bit is inserted, the stuff bit may be scrambled and be included in the PHY frame. A value of the stuff bit may be set to be zero, and scrambled using the continuation of a scrambler sequence that scrambles the MAC header field and the HCS field. When the stuff bit is not needed, the process of filling the stuff bit, which is the process of generating and scrambling stuff bits and inserting a field including information on the scrambled stuff bits, may be omitted from the method illustrated in FIG. 12A.

The PHY header field, the scrambled MAC header field, the scrambled HCS field, the RS parity bit field, and the scrambled stuff bit field (when the stuff bit is used) may be concatenated to form a header.

The header may be spread using a pseudo-random binary sequence (PRBS) generated using an LFSR. For example, a spreading factor of 16 (SF=16) may be used. When the spreading factor increases to be greater than 16 for improved robustness, an additional spreading process may be performed. For example, when a spreading factor of 32 is used, the spreading may be performed with a spreading factor of 16 and then a bit repetition may be applied using an additional spreading factor of 2 as illustrated in FIG. 12A. The spread header may be converted to a form of an OOK wave.

In general, robustness may be important for a header. When a required degree of robustness is low, a spreading factor may be reduced to 16 or 8. Conversely, when the required degree of robustness is high, a large value, for example, 32, may be used as the spreading factor. Through an addition of a bit repetition or use of a Golay sequence, the spreading factor may increase to 64. Since the header is sufficiently robust using a higher spreading factor, the pilot symbol may be omitted. In such a case, a block building process may be omitted.

For example, a block size in an OOK PHY may be 512 bits. In the header, the PHY header field may be 32 bits, the MAC header field may be 80 bits, the HCS field may be 16 bits, and the RS parity bit field may be 128 bits. Thus, the header may be 256 bits in total.

Figure 12B:
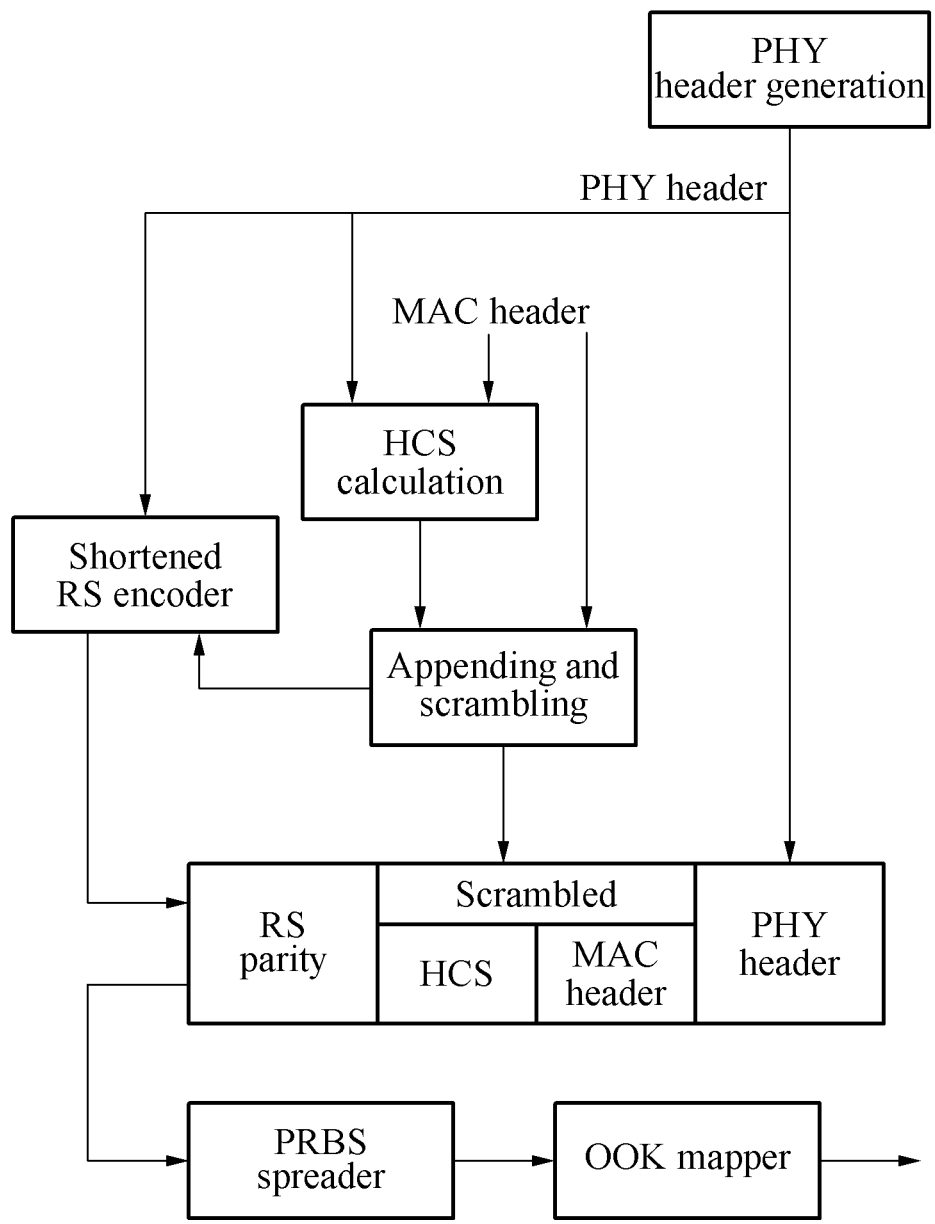
FIG. 12B is a diagram illustrating another example of a flow of a method of processing a base header field included in a PHY frame of an LC PHY according to an example embodiment.

When the pilot symbol is omitted and the spreading factor of the header of the PHY frame is set to be a multiple of 2, for example, SF=2, 4, 6, . . . 32, a 256 bit length of the PHY header field may become a multiple of 512, for example, a multiple of the block size. In such a case, the stuff bit may not be needed, and thus the process of filling the stuff bit may be omitted. That is, the process of generating and scrambling the stuff bit and of inserting the scrambled stuff bit may be omitted. Such a case is illustrated in FIG. 12B, and a process of processing a header may become more simplified, dissimilar to the case illustrated in FIG. 12A.

Figure 13A:
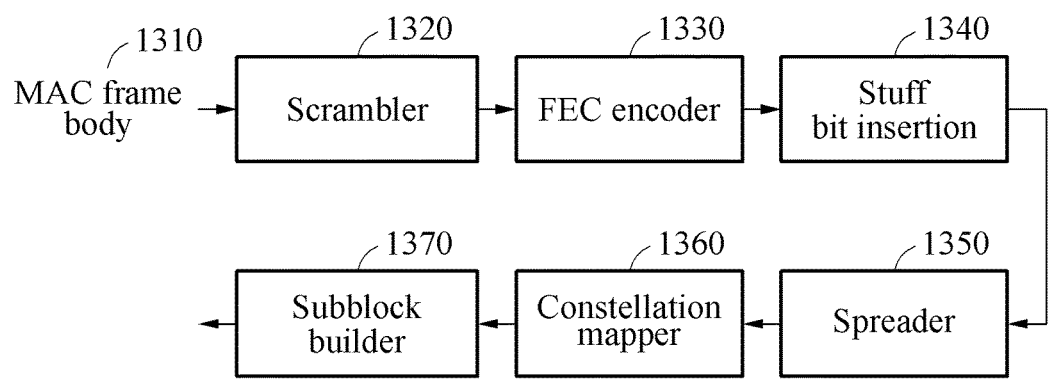
FIG. 13A is a diagram illustrating a flow of a method of processing a frame body included in a PHY frame of an LC PHY according to an example embodiment.

FIG. 13A is a diagram illustrating a method of processing a frame body included in a PHY frame of an LC PHY according to an example embodiment.

Referring to FIG. 13A, in operation 1320, the transmitter 110 scrambles a MAC frame body 1310 including a MAC subheader and a MAC subframe using a PRBS.

In operation 1330, the transmitter 110 encodes the scrambled MAC frame body. The transmitter 110 may encode the scrambled MAC frame body with RS (240, 224). In such a case, a bit number to be processed at a time may be a multiple of 32 and processing by a 32 bit unit may be possible, and thus effective processing may be enabled.

In operation 1340, a stuff bit is inserted into the scrambled and encoded MAC frame body.

In operation 1350, a result obtained from the insertion of the stuff bit is spread. When an OOK modulation method is used, a bit repetition with a spreading factor of 2 (SF=2) may be applied. For example, 10101010 may be spread to 1100110011001100 through the bit repetition. Thus, a complexity may be lowered.

In operation 1360, a result obtained from the spreading is converted to the OOK modulation method through a constellation mapper.

In operation 1370, a pilot symbol is inserted into a result obtained from the conversion, and converted to a block by a subblock builder.

Figure 13B:
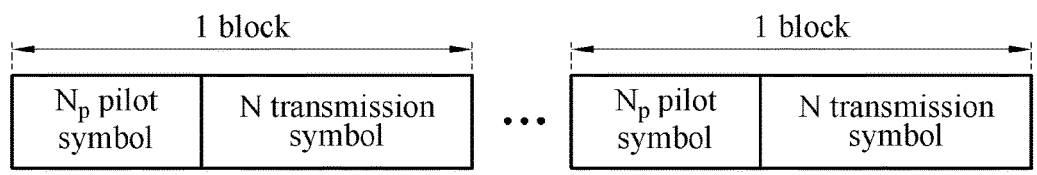
FIG. 13B is a diagram illustrating a structure of a block of a PHY frame of an LC PHY according to an example embodiment.

FIG. 13B is a diagram illustrating a structure of a block of a PHY frame of an LC PHY according to an example embodiment.

For example, a size of a block (or a block size) of a header of data to be modulated using an OOK modulation method may be 512 irrespective of a spreading factor. A block size of a payload may become a spreading factor×512 (SF×512). For example, a block size may be 512 bits in response to the spreading factor being 1, and a block size may be 1024 bits in response to the spreading factor being 2.

According to an example embodiment, a pilot word or a pilot symbol may be included in the front portion of each block which is used for, for example, timing tracking, compensation for a clock drift, compensation for a frequency offset error, and functions as a cyclic prefix for performing frequency-domain equalization.

According to an example embodiment, information as to whether the pilot symbol is included and information on a length of the pilot symbol may be indicated through a separate field included in the header. When the pilot symbol is included at a time of a frame transmission, in a frame body to be modulated by the OOK modulation method, the pilot symbol may be set to be 1010 in response to the spreading factor being 1 (SF=1) and set to be 11001100 in response to the spreading factor being 2 (SF=2). That is, a result obtained by performing a bit repetition with a spreading factor of 2 (SF=2) on the pilot symbol with a spreading symbol of 1 (SF=1) may be the pilot symbol with a spreading factor of 2 (SF=2). Similarly, when a spreading factor is N (SF=N), the pilot symbol may be obtained by performing a bit repetition with a spreading factor of N (SF=N) on a pilot symbol with a spreading factor of 1 (SF=1). Thus, when the spreading is applied as described above, a result obtained through a bit repetition of a pilot symbol with a spreading factor of 1 (SF=1) by the number of a corresponding spreading factor may be set to be the pilot symbol. When a length of the pilot symbol is determined based on a spreading factor, information as to whether the pilot symbol is included in a frame to be transmitted may be indicated using 1 bit in the PHY header, and the length of the pilot symbol may not need to be separately indicated.

For example, when the pilot symbol is set as described above, in a case of the spreading factor being 1 (SF=1), a block size may be 512, of which the pilot symbol may be 4 bits and a bit number of data to be included in one block may be 508 bits. In a case of the spreading factor being 2 (SF=2), a block size may be 1024, of which the pilot symbol may be 8 bits and a bit number of data to be included in one block may be 1016 bits. Similarly, when a spreading factor is N (SF=N), a block size may be 512 bits×N, of which the pilot symbol may be 4 bits×N and a bit number of data to be included in one block may be 508 bits×N.

Thus, when a block size and a bit number of a pilot symbol are set to be a multiple of a spreading factor, and the pilot symbol undergoes a bit repetition by a value of the spreading factor, a block building process may be simplified by dividing the encoded MAC frame body by a 508 bit unit before the spreading process, inserting 4 bits of a corresponding pilot symbol in a case of the spreading factor being 1 (SF=1) into a front of each 508 bit, and performing the spreading on a result which is 512 bit, instead of performing a method of generating and inserting a pilot symbol for a corresponding spreading factor after a constellation mapping process.

When dividing the encoded MAC frame body by a bit number unit of a data portion to be included in one block, for example, a 508 bit unit in a case of a spreading factor being 1 (SF=1) and the pilot symbol being used and a 512 bit unit in a case of the pilot symbol not being used, the MAC frame body may not fill the bit number unit of the data portion to be included in the last block. In such a case, the transmitter 110 may fill the bit number unit by inserting a stuff bit. For example, the transmitter 110 may insert the stuff bit to allow a sum of a bit number of the pilot symbol, a bit number of the data portion, and a bit number of the stuff bit to be equal to a block size of 512 bits in a case of the spreading factor being 1 (SF=1).

That is, when the bit number of the encoded MAC frame body is not a multiple of the bit number of the data portion to be actually included in one block, stuff bits may be inserted into an end of the block to fill the last block. Here, when the pilot symbol is included in a block, a result obtained by subtracting a length of the pilot symbol from a size of the block may be a length of the data portion. When the pilot symbol is not included in the block, the bit number of the data portion may be equal to a bit number of one block.

When the stuff bit is inserted into a PHY frame, the stuff bit may be scrambled and be included in the PHY frame. A value of the stuff bit may be set to be zero, and the transmitter 110 may scramble the stuff bit using the continuation of a scrambler sequence that scrambles the MAC frame body.

As described above, a frame body may use a bit repetition for the spreading, and a size of one block in a case of a spreading factor being N (SF=N) may be 512×N, and thus the insertion of a stuff bit may be performed based permanently on a case of a spreading factor being 1 (SF=1) and then a frame including the stuff bit may be spread with the spreading factor of N (SF=N). That is, the stuff bit is inserted as in the case for the spreading factor is 1 (SF=1) before a frame spreading process, which is operation 1350, for example, in which a block size is 512 (when the pilot symbol is not used) or 508 (when the pilot symbol is used), and the spreading for the frame including the stuff bit may be performed in operation 1350. Thus, a block building process may be simplified.

As described above, when a block size and a bit number of a pilot symbol are set to be a multiple of a spreading factor, and a bit repetition is performed on the pilot symbol by the number of the spreading factor, the transmitter 110 may simplify a block building process by generating a pilot symbol and a stuff bit in a case of a spreading factor being 1 (SF=1) before the spreading process and by spreading the generated frame body, the stuff bit, and the pilot symbol together, instead of performing a process of calculating a total bit number and a block size after the spreading and then generating the stuff bit.

When using channel bonding, a time duration during which a pilot symbol is transmitted may be shortened, and thus timing tracking, compensation for a clock drift, compensation for a frequency offset error, and frequency-domain equalization may not be readily performed using the pilot symbol.

In such a case, the transmitter 110 may increase a block size and a bit number of the pilot symbol in proportion to the number of bonded channels. For example, when a spreading factor is N (SF=N) and the number of bonded channels is M, a block size may be 512 bits×N×M, the bit number of the pilot symbol may be 4 bits×N×M, and a bit number of data may be 508 bits×N×M.

Thus, a transmission time for the pilot symbol may be the same as in a case of a single channel, and thus the timing tracking, the compensation for a clock drift, the compensation for a frequency offset error, and the frequency-domain equalization may be more readily performed using the pilot symbol.

Alternatively, in a case of a ultra-close proximity transmission performed within 10 centimeters (cm) or less, a channel may be stable and a probability of an occurrence of an error may be low, and thus there is no need to increase the block size and the bit number of the pilot symbol in proportion to the number of bonded channels, but there is a need to increase the block size and the bit number of the pilot symbol in proportion only to the spreading factor at a time of the channel bonding.

The apparatuses, units, modules, devices, and other components that are described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A close-proximity communication method performed by a transmitter, the method comprising:
generating a physical layer (PHY) frame comprising a preamble, a frame header, and a payload field; and
transmitting the generated PHY frame to a receiver,
wherein the preamble comprises a frame synchronization (SYNC) field, a start frame delimiter (SFD) field and a channel estimation sequence (CES) field, and
wherein when channel bonding is used, the SYNC field, the SFD field and the CES field are repeated in the preamble by a number of bonded channels.

2. A transmitter comprising:
a processor configured to generate a physical layer (PHY) frame comprising a preamble, a frame header, and a payload field; and
a communicator configured to transmit the generated PHY frame to a receiver,
wherein the preamble comprises a frame synchronization (SYNC) field, a start frame delimiter (SFD) field and a channel estimation sequence (CES) field, and
wherein when channel bonding is used, the SYNC field, the SFD field and the CES field are repeated in the frame preamble by a number of bonded channels.

3. A close-proximity communication method performed by a receiver, the method comprising:
receiving, from a transmitter, a physical layer (PHY) frame comprising a preamble, a frame header, and a payload field; and
communicating with the transmitter based on information obtained from the received PHY frame,
wherein the preamble comprises a frame synchronization (SYNC) field, a start frame delimiter (SFD) field and a channel estimation sequence (CES) field, and
wherein when channel bonding is used, the SYNC field, the SFD field and the CES field are repeated in the frame preamble by a number of bonded channels.

4. A receiver comprising:
a communicator configured to receive, from a transmitter, a physical layer (PHY) frame comprising a preamble, a frame header, and a payload field; and
a processor configured to obtain information from the received PHY frame,
wherein the preamble comprises a frame synchronization (SYNC) field, a start frame delimiter (SFD) field and a channel estimation sequence (CES) field, and
wherein when channel bonding is used, the SYNC field, the SFD field and the CES field are repeated in the frame preamble by a number of bonded channels.

5. The close-proximity communication method of claim 1, wherein the transmitter is configured to use the channel bonding which uses contiguous two, three or four channels.

6. The close-proximity communication method of claim 1, wherein the SFD field comprises information on the number of channels to be used for the channel bonding.

7. The close-proximity communication method of claim 1, wherein the SFD field comprises a Golay sequence indicating a delimiter, and a presence or an absence of the CES field.

8. The close-proximity communication method of claim 1, wherein the frame header comprises a scrambler seed identifier (ID) field, an aggregation field, a frame length field and a pilot symbol field.

9. The close-proximity communication method of claim 8, wherein the scrambler seed ID field comprises information associated with an identifier of a scrambler seed.

10. The close-proximity communication method of claim 8, wherein the aggregation field comprises a value indicating whether a frame aggregation is used.

11. The close-proximity communication method of claim 8, wherein the frame length field comprises a value indicating a length of a MAC frame body from which the frame header and the preamble are excluded.

12. The close-proximity communication method of claim 8, wherein the pilot symbol field comprises a value indicating whether a pilot symbol is used.

13. The transmitter of claim 2, wherein a duration of a preamble in which the channel bonding is applied is same as a duration of a preamble in which the channel bonding is not applied, by the repetition of subfields of the preamble.

14. The transmitter of claim 2, wherein the SFD field comprises information on the number of channels to be used for the channel bonding.

15. The transmitter of claim 2, wherein the SFD field comprises a Golay sequence indicating, a delimiter, and a presence or an absence of the CES field.

16. The close-proximity communication method of claim 3, wherein a duration of a preamble in which the channel bonding is applied is same as a duration of a preamble in which the channel bonding is not applied, by the repetition of subfields of the preamble.

17. The close-proximity communication method of claim 3, wherein the SFD field comprises information on the number of channels to be used for the channel bonding.

18. The close-proximity communication method of claim 3, wherein the SFD field comprises a Golay sequence indicating a delimiter, and a presence or an absence of the CES field.

19. The receiver of claim 4, wherein a duration of a preamble in which the channel bonding is applied is same as a duration of a preamble in which the channel bonding is not applied, by the repetition of subfields of the preamble.

* * * * *